US009475409B2

(12) United States Patent
Jiang et al.

(10) Patent No.: US 9,475,409 B2
(45) Date of Patent: Oct. 25, 2016

(54) SEAT RECLINER AND OIL COLLECTING ELEMENT

(71) Applicant: HUBEI AVIATION PRECISION MACHINERY TECHNOLOGY CO., LTD., Xiangfan, Hubei (CN)

(72) Inventors: Chong Jiang, Hubei (CN); Zhengkun Huang, Hubei (CN); Xing Huang, Hubei (CN); Yong Zhang, Hubei (CN)

(73) Assignee: HUBEI AVIATION PRECISION MACHINERY TECHNOLOGY CO., LTD., Xiangfan, Hubei (CN)

( * ) Notice: Subject to any disclaimer, the term of this patent is extended or adjusted under 35 U.S.C. 154(b) by 89 days.

(21) Appl. No.: 14/232,053

(22) PCT Filed: Jul. 9, 2013

(86) PCT No.: PCT/CN2013/079056
§ 371 (c)(1),
(2) Date: Jan. 10, 2014

(87) PCT Pub. No.: WO2014/201739
PCT Pub. Date: Dec. 24, 2014

(65) Prior Publication Data
US 2014/0367199 A1 Dec. 18, 2014

(30) Foreign Application Priority Data
Jun. 17, 2013 (CN) .......................... 2013 1 0239096

(51) Int. Cl.
*F16H 57/04* (2010.01)
*B60N 2/22* (2006.01)
(Continued)

(52) U.S. Cl.
CPC ........... *B60N 2/2213* (2013.01); *B60N 2/2252* (2013.01); *B60N 2/2254* (2013.01); *F16H 57/0427* (2013.01); *F16H 57/0486* (2013.01); *F16H 1/32* (2013.01)

(58) Field of Classification Search
CPC B60N 2/2252; B60N 2/2254; B60N 2/2213; F16H 57/0427; F16H 57/0486
USPC ......................................................... 184/14
See application file for complete search history.

(56) References Cited

U.S. PATENT DOCUMENTS 4,887,863 A * 12/1989 Caillol ................. B60N 2/2252
297/362
(Continued)

FOREIGN PATENT DOCUMENTS

| CN | 1370119 A | 9/2002 |
|---|---|---|
| CN | 101524973 | 9/2009 |

(Continued)

OTHER PUBLICATIONS

International Search Report from International Application No. PCT/CN2013/079056 mailed Mar. 20, 2014.
(Continued)

*Primary Examiner* — Michael Riegelman
(74) *Attorney, Agent, or Firm* — Merchant & Gould P.C.

(57) ABSTRACT

A seat recliner and an oil collecting element can re-collect the lubricating oil between a friction pair to friction surfaces, so as to reduce the wear rate. The oil collecting element is fixedly connected with one component in a friction pair of the seat recliner. The oil collecting element has an end face facing towards the other component in the friction pair, and each of two ends of the end face is provided with a boss, so as to form an oil collecting gap in the middle of the end face. The side face of the boss is an oil guiding face, and is configured gradually closer to the center of the oil collecting gap from outside to inside. During moving, an outer side of the oil guiding face of the boss firstly abuts against an end wall of the other component, so as to block the lubricating oil rolled to the two ends of the other component by the friction pair, and the blocked lubricating oil further flows towards the oil collecting gap in the middle of the end face of the oil collecting component along the oil guiding face of the boss, thus lubricating the friction surfaces. When the friction pair operates at a high speed, the oil collecting gap of the oil collecting element acts as a dynamic oil passage, and collects the lubricating oil to the portion between the friction surfaces continuously.

20 Claims, 8 Drawing Sheets

(51) Int. Cl.
*B60N 2/225* (2006.01)
*F16H 1/32* (2006.01)

(56) References Cited

U.S. PATENT DOCUMENTS

| | | | | |
|---|---|---|---|---|
| 5,154,475 A * | 10/1992 | Kafitz | B60N 2/2254 | 297/362 |
| 5,312,158 A * | 5/1994 | Wittig | B60N 2/2227 | 297/362 |
| 5,452,938 A * | 9/1995 | Ernst | B60N 2/2254 | 297/362 |
| 5,634,380 A * | 6/1997 | Scholz | B60N 2/2252 | 297/362 |
| 5,810,442 A * | 9/1998 | Ito | B60N 2/2252 | 297/362 |
| 5,928,105 A * | 7/1999 | Taha | F16H 57/04 | 475/331 |
| 6,305,748 B1 * | 10/2001 | Ohba | B60N 2/2252 | 297/362 |
| 6,619,743 B1 * | 9/2003 | Scholz | B60N 2/225 | 297/362 |
| 6,692,397 B2 * | 2/2004 | Wang | B60N 2/2252 | 297/362 |
| 6,755,470 B2 * | 6/2004 | Iwata | B60N 2/2252 | 297/361.1 |
| 6,918,635 B2 * | 7/2005 | Finner | B60N 2/2254 | 297/362 |
| 7,086,699 B1 * | 8/2006 | Addison | B60N 2/2252 | 297/362 |
| 7,090,298 B2 * | 8/2006 | Lange | B60N 2/2252 | 297/362 |
| 7,090,299 B2 * | 8/2006 | Lange | B60N 2/2254 | 297/362 |
| 7,114,778 B2 * | 10/2006 | Schuler | B60N 2/1615 | 297/367 R |
| 7,201,079 B2 * | 4/2007 | Stemmer | B60N 2/167 | 297/353 |
| 7,243,994 B2 * | 7/2007 | Cha | B60N 2/2254 | 297/362 |
| 7,278,689 B2 * | 10/2007 | Guillouet | B60N 2/2254 | 297/362 |
| 7,281,765 B2 * | 10/2007 | Scholz | B60N 2/2254 | 297/362 |
| 7,390,061 B2 * | 6/2008 | Lange | B60N 2/2252 | 297/362 |
| 7,455,361 B2 * | 11/2008 | Stemmer | B60N 2/2254 | 297/362 |
| 7,461,900 B2 * | 12/2008 | Lange | B60N 2/2252 | 297/362 |
| 7,497,519 B2 * | 3/2009 | Dill | B60N 2/2252 | 297/362 |
| 7,513,573 B2 * | 4/2009 | Wahls | B60N 2/2252 | 297/362 |
| 7,517,021 B2 * | 4/2009 | Wahls | B60N 2/2356 | 297/367 R |
| 7,571,962 B2 * | 8/2009 | Thiel | B60N 2/2252 | 297/362 |
| 7,607,737 B2 * | 10/2009 | Liebich | B60N 2/2254 | 297/362 |
| 7,648,203 B2 * | 1/2010 | Voss | B60N 2/2252 | 297/362 |
| 7,677,665 B2 * | 3/2010 | Eppert | B60N 2/2252 | 297/362 |
| 7,726,743 B2 * | 6/2010 | Smith | B60N 2/2252 | 297/362 |
| 7,731,289 B2 * | 6/2010 | Matsumoto | B60N 2/2254 | 297/362 |
| 7,753,450 B2 * | 7/2010 | Eppert | B60N 2/2254 | 297/361.1 |
| 7,775,598 B2 * | 8/2010 | Schmitz | B60N 2/20 | 297/362 |
| 7,878,593 B2 * | 2/2011 | Nae | B60N 2/2252 | 297/362 |
| 7,946,652 B2 * | 5/2011 | Stilleke | B60N 2/2252 | 297/362 |
| 8,128,169 B2 * | 3/2012 | Narita | B60N 2/0232 | 297/362 |
| 8,298,110 B2 * | 10/2012 | Schuler | B60N 2/2252 | 475/180 |
| 8,336,962 B2 * | 12/2012 | Thiel | B60N 2/2252 | 297/354.12 |
| 8,460,145 B2 * | 6/2013 | Mitsuhashi | B60N 2/2252 | 297/362 |
| 8,672,408 B2 * | 3/2014 | Legras | B60N 2/2255 | 297/361.1 |
| 8,911,319 B2 * | 12/2014 | Chae | B60N 2/2252 | 475/162 |
| 8,931,843 B2 * | 1/2015 | Schuler | B60N 2/2252 | 297/367 R |
| 9,039,088 B2 * | 5/2015 | Lehmann | B60N 2/12 | 297/366 |
| 2006/0220430 A1 * | 10/2006 | Baloche Faurecia | B60N 2/225 | 297/362 |
| 2008/0193203 A1 * | 8/2008 | Voss | B60N 2/2252 | 403/97 |
| 2008/0272639 A1 * | 11/2008 | Huang | B60N 2/2252 | 297/362 |
| 2010/0176640 A1 * | 7/2010 | Hayashi | B60N 2/2254 | 297/362 |
| 2011/0254337 A1 * | 10/2011 | Jiang | B60N 2/2252 | 297/362 |
| 2011/0277574 A1 * | 11/2011 | Mitsuhashi | B60N 2/2252 | 74/411.5 |
| 2012/0205956 A1 * | 8/2012 | Nock | B60N 2/2252 | 297/362 |
| 2014/0239694 A1 * | 8/2014 | Jiang | B60N 2/2254 | 297/362 |
| 2014/0367199 A1 * | 12/2014 | Jiang | B60N 2/2213 | 184/14 |

FOREIGN PATENT DOCUMENTS

| | | |
|---|---|---|
| CN | 101920667 | 12/2010 |
| CN | 102248901 | 11/2011 |
| CN | 202528869 U | 11/2012 |
| CN | 202664847 | 1/2013 |
| CN | 103129418 A | 6/2013 |
| CN | 203381519 | 1/2014 |
| DE | 197 29 562 | 1/1998 |
| DE | 202007013685 U1 | 12/2009 |
| DE | 102010038795 A1 | 2/2012 |
| GB | 2270732 A | 3/1994 |
| GB | 2294308 A | 4/1996 |
| JP | 2009165647 A | 7/2009 |

OTHER PUBLICATIONS

Extended European Search Report from European Patent Application No. 13805724.5, issued Dec. 23, 2015.

* cited by examiner

SEAT RECLINER AND OIL COLLECTING ELEMENT

The present application claims the priority to Chinese patent application No. 201310239096.2 titled "SEAT RECLINER AND OIL COLLECTING ELEMENT", filed with the Chinese State Intellectual Property Office on Jun. 17, 2013. The entire disclosure of the application is incorporated herein by reference.

FIELD OF THE INVENTION

The present application relates to the technical field of seat angle adjustment, and particularly relates to an oil collecting element for a seat recliner. The present application further relates to a seat recliner having the above oil collecting element.

BACKGROUND OF THE INVENTION

Currently, there are generally two kinds of seat recliner. One kind of seat recliner is of a leaf-spring adjusting mechanism based on a principle of ratchet mechanism; and the other kind of seat recliner is of a gear adjusting mechanism based on a principle of planetary gear transmission.

Figure 1:
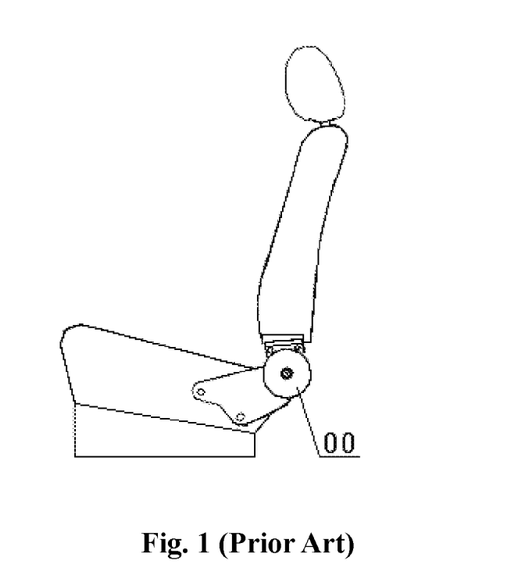
FIG. 1 is an external structural diagram of a seat in the prior art.
Figure 2:
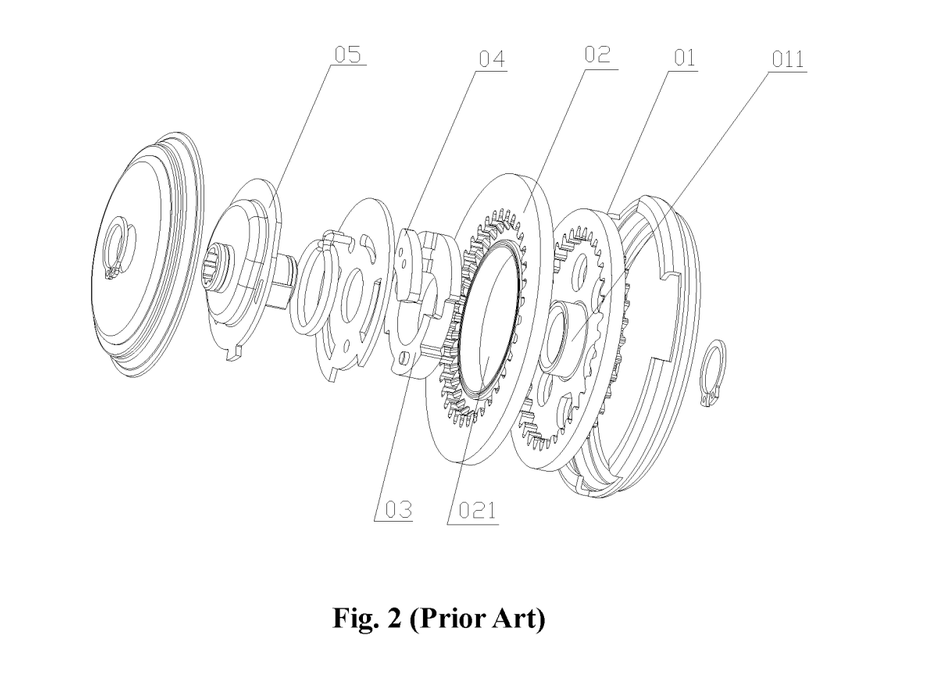
FIG. 2 is an assembly exploded view of a seat recliner in an embodiment in the prior art.
Figure 3:
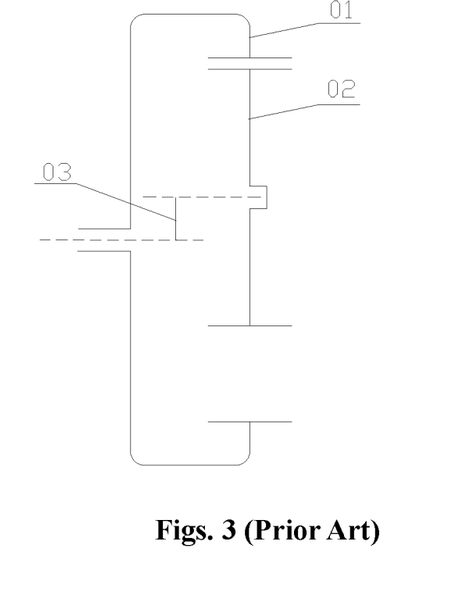
FIG. 3 is a structural simplified diagram of a gear transmission mechanism in the seat recliner as shown in FIG. 2.

Referring to FIGS. 1 to 3, FIG. 1 is an external structural diagram of a seat in the prior art; FIG. 2 is an assembly exploded view of a seat recliner in an embodiment in the prior art; and FIG. 3 is a structural simplified diagram of a gear transmission mechanism in the seat recliner as shown in FIG. 2.

A conventional seat recliner 00 is mounted between a seat back and a seat base, and generally implemented through a planetary gear transmission, as shown in FIG. 1.

As shown in FIGS. 2 and 3, the conventional seat recliner 00 includes an inner toothed plate 01 having an inner toothed rim, an outer toothed plate 02 having an outer toothed rim, an eccentric wheel 03, a wedge block 04, and a drive cam 05. Specifically, the inner toothed plate 01 is adapted to be fixedly connected with the seat back, and the central portion of the inner toothed plate 01 is provided with a shaft shoulder 011. The outer toothed plate 02 is adapted to be fixedly connected with the seat base, and the central portion of the outer toothed plate 02 is provided with a central hole 021. The outer toothed rim is meshed with the inner toothed rim, and a radial eccentric area is formed between the shaft shoulder 011 and the central hole 021. The eccentric wheel 03 is placed in the radial eccentric area. The eccentric wheel 03, the inner toothed plate 01 and the outer toothed plate 02 constitute a planetary gear transmission mechanism with few tooth difference. The wedge block 04 is placed in the radial eccentric area, and under a circumferential force applied by an elastic member, the eccentric wheel 03 and the wedge block 04 eliminate gaps between the eccentric wheel 03 and the central hole 021 of the outer toothed plate 02 and between the meshed teeth. The drive cam 05 drives the eccentric wheel 03 or the wedge block 04, so as to enable a relative rotation between the inner toothed plate 01 and the outer toothed plate 02 by an angle.

When the drive cam 05 drives the eccentric wheel 03 or the wedge block 04 to rotate, the eccentric wheel 03 and the central hole 021 of the outer toothed wheel 02, the eccentric wheel 03 and the shaft shoulder 011 of the inner toothed plate 01, the wedge block 04 and the central hole 021 of the outer toothed wheel 02, and the wedge block 04 and the shaft shoulder 011 of the inner toothed plate 01 constitute four friction pairs each undergoing three stages of oil lubrication, boundary friction and dry friction.

The oil lubrication means the friction with lubricating oil between two friction surfaces. The boundary friction means that, there is lubricating oil between two friction surfaces, and an extremely thin boundary oil film is formed on the metal surface due to the absorption between the lubricating oil and the metal surface and has the thickness of less than 1 μm, which is not sufficient to separate two metal surfaces, so that the microcosmic peaks of the two metal surfaces will rub against each other while moving relative to each other. The dry friction means the friction without lubricating oil.

At the beginning stage, each of the above friction pairs remains in oil lubrication and boundary friction. With the increasing use, the lubricating oil between two components forming a friction pair are rolled to two ends of the friction surfaces, so that the friction between the friction pair will turn into the dry friction. Then, the wear between the two components forming the friction pair is aggravated. After a certain degree of wear, a shaking gap will be formed between the seat recliner 00 and the seat, so that noise, shaking and so on may exist in operation, and therefore the comfort of the seat may be affected.

With the development of auto industry, higher and higher requirement are imposed on the service life and comfort of the seat. However, the service life and comfort of the seat are greatly influenced by the seat recliner 00. Thus, the conventional seat recliner 00 fails to meet the requirement of users.

Therefore, a technical problem to be solved presently by the person skilled in the art is to design a seat recliner which may reduce the wear of its inner friction pairs and prolong its service life.

SUMMARY OF THE INVENTION

An object of the present application is to provide a seat recliner, in which inner friction pairs remain in states of oil lubrication and boundary friction all along with a slower wear rate.

Another object of the present application is to provide an oil collecting element of a seat recliner, which is capable of re-collecting the lubricating oil between a friction pair inside the seat recliner to friction surfaces, so as to reduce the wear rate of the friction pair.

To solve the above technical problems, there is provided in the present application an oil collecting element of a seat recliner. The oil collecting element is fixedly connected with one of components forming a friction pair in the seat recliner, and has an end face facing towards the other component in the friction pair. Each of two ends of the end face is provided with a boss, such as to form an oil collecting gap at the middle of the end face. A side face of the boss serves as an oil guiding face, and is configured to be gradually closer to the center of the oil collecting gap from outside to inside.

The oil collecting element according to the present application is fixedly connected to one component of a friction pair, and is provided with a boss at each of the two ends of the end face facing towards the other component in the friction pair, wherein an oil collecting gap is formed in the middle of the end face, a side face of the boss is configured to be gradually closer to the center of the oil collecting gap in a direction from outside to inside, and thus serves as an oil guiding face. During moving, the outer side of the side face of the boss firstly abuts against an end wall of the other component, so as to block the lubricating oil rolled to the two ends of the other component by the friction pair, and the blocked lubricating oil further flows towards the oil collecting gap along the oil guiding face (the side face of the boss), thereby lubricating the friction surfaces. When the friction pair operates at a high speed, the oil collecting gap of the oil collecting element acts as a dynamic oil passage of the lubricating oil, and collects the lubricating oil into the portion between the friction surfaces of the friction pair continuously, thereby effectively reducing the wear rate of the friction pair and prolonging the service life of the seat recliner.

Preferably, the boss located at each of the two ends is symmetrically configured with respect to a longitudinal centerline of the oil collecting element.

When the boss are arranged symmetrically, the oil collecting gap located in the middle of the end face is also of a symmetrical structure, and the lubricating oil can be symmetrically distributed at two sides of the oil collecting element evenly, so as to evenly lubricate the friction surfaces at the two sides of the oil collecting element, thereby avoiding partial occurrence of the dry friction.

Preferably, the cross section of the boss is configured to be in a half circular shape.

Preferably, the cross section of the boss is configured to be in an isosceles trapezoidal shape.

Preferably, the cross section of the boss is configured to be in an isosceles triangular shape.

When the boss is of a symmetrical structure, the cross section may be varied, such as in a half circular shape, an isosceles trapezoidal shape, or an isosceles triangular shape, etc. In this case, the side face of the boss has a smooth transition in the direction from outside to inside, which facilitates guiding the lubricating oil to flow into the middle of the oil collecting gap, thereby enhancing the oil collecting effect.

Preferably, the oil collecting element is an elastic member.

When the oil collecting element is an elastic member, the elastic deformation of the oil collecting element will apply a pressing force to the other component in the friction pair, so as to scrape effectively the lubricating oil at the two ends of the other component, and then enable the lubricating oil to flow into the oil collecting gap at the middle of the oil collecting element.

There is also provided in the present application a seat recliner. A friction pair is formed between two components of the seat recliner, and one component in the friction pair is fixedly connected with the oil collecting element described above.

Preferably, the seat recliner includes an inner toothed plate having a shaft shoulder, an outer toothed plate having a central hole, an eccentric wheel and a wedge block. Friction pairs are formed between the eccentric wheel and the outer surface of the shaft shoulder, between the eccentric wheel and the inner wall of the central hole, between the wedge block and the outer surface of the shaft shoulder, and between the wedge block and the inner wall of the central hole.

Preferably, the oil collecting element is provided with a connecting boss, and the eccentric wheel and the wedge block each are provided with a groove fixedly engaged with the connecting boss, so as to improve the reliability of the connection and the convenience of the detachment.

Since the seat recliner according to the present application has the oil collecting element described above, the technical effects of the oil collecting element described above are applicable to the seat recliner according to the present application.

DETAILED DESCRIPTION OF THE EMBODIMENTS

An object of the present application is to provide a seat recliner in which inner friction pairs are always in states of oil lubrication and boundary friction with a slower wear rate.

Another object of the present application is to provide an oil collecting element of a seat recliner, which is capable of re-collecting the lubricating oil between a friction pair inside the seat recliner to friction surfaces, so as to reduce the wear rate of the friction pair.

For those skilled in the art to understand better the technical solutions of the present application, the present application will be further explained in detail in conjunction with the accompanying drawings and the embodiments below.

Figure 4:
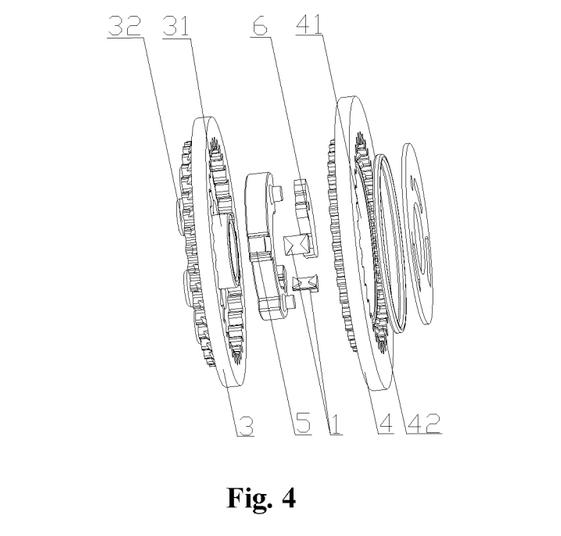
FIG. 4 is an assembly exploded perspective view of a seat recliner in an embodiment according to the present application.
Figure 5:
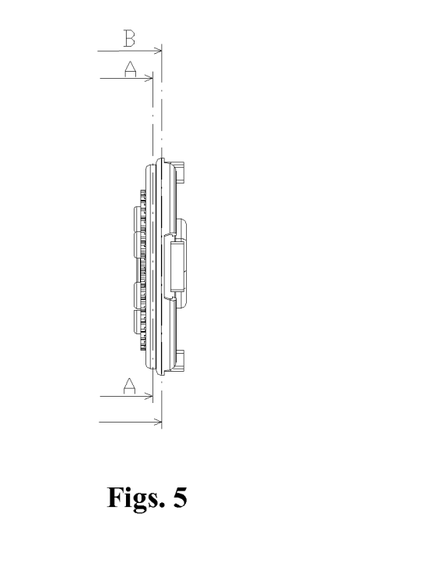
FIG. 5 is a structural view of the seat recliner as shown in FIG. 4 after assembled.
Figure 6:
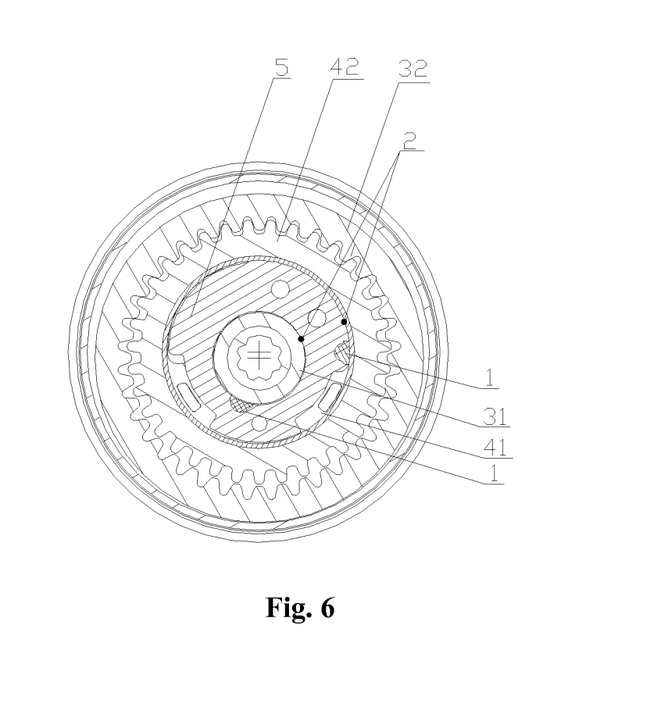
FIG. 6 is a sectional view of the seat recliner as shown in FIG. 5 taken along a direction A-A.
Figure 7:
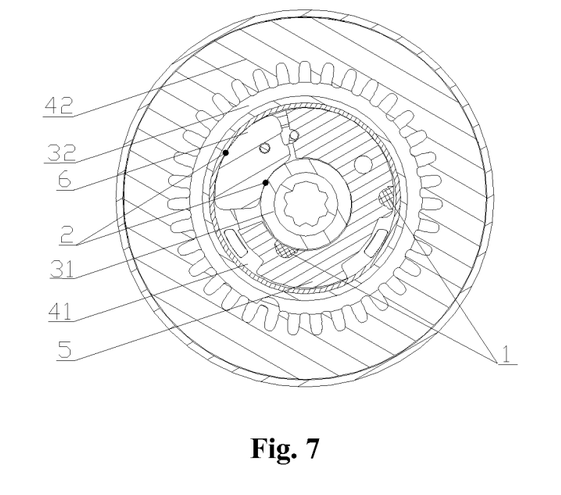
FIG. 7 is a sectional view of the seat recliner as shown in FIG. 5 taken along a direction B-B.

Referring to FIGS. 4 to 7, FIG. 4 is an assembly exploded perspective view of a seat recliner in an embodiment according to the present application; FIG. 5 is structural view of the seat recliner as shown in FIG. 4 after assembled; FIG. 6 is a sectional view of the seat recliner as shown in FIG. 5 taken along a direction A-A; and FIG. 7 is a sectional view of the seat recliner as shown in FIG. 5 taken along a direction B-B.

The seat recliner according to the present application includes an inner toothed plate 3, an outer toothed plate 4, an eccentric wheel 5 and a wedge block 6. The inner toothed plate 3 has an inner toothed rim 32, and a shaft shoulder 31 is provided in the central portion of the inner toothed plate 3. The outer toothed plate 4 has an outer toothed rim 42, and a central hole 41 is provided in the central portion of the outer toothed plate 4. The inner toothed plate 3 and the outer toothed plate 4 are engaged by the inner toothed rim 32 and the outer toothed rim 42, respectively. A radial eccentric area is formed between the shaft shoulder 31 and the central hole 41, and each of the eccentric wheel 5 and the wedge block 6 are internally disposed in the radial eccentric area. Here, two friction pairs 2 are formed of an inner end face of the eccentric wheel 5 and the outer surface of the shaft shoulder 31, as well as an outer end face of the eccentric wheel 5 and the inner surface of the central hole 41, as shown in FIG. 6. two friction pairs 2 are also formed of an inner end face of the wedge block 6 and the outer surface of the shaft shoulder 31, as well as an outer end face of the wedge block 6 and the inner surface of the central hole 41, as shown in FIG. 7.

The seat recliner according to the present application is further provided with an oil collecting element 1. The oil collecting element 1 is fixedly connected with one component in a friction pair 2, with its end face 11 (referring to FIG. 8) facing towards the other component in the friction pair 2. The end face 11 may be structurally configured such as to re-collect the lubricating oil, which has been rolled to the two ends of the friction surfaces by the friction pair 2, to the intermediate portion between the two friction surfaces, as shown in FIGS. 6 and 7.

In theory, the oil collecting element 1 may be fixedly connected to either component of the friction pairs 2, and may be specifically connected to the inner wall of the central hole 41, the eccentric wheel 5, the wedge block 6 or the shaft shoulder 31. Apparently, since the friction pairs 2 are formed between the inner end face of the eccentric wheel 5 and the outer surface of the shaft shoulder 31, between the outer end face of the eccentric wheel 5 and the inner wall of the central hole 41, between the inner end face of the wedge block 6 and the outer surface of the shaft shoulder 31, and between the outer end face of the wedge block 6 and the inner wall of the central hole 41, the oil collecting element 1 only needs to be provided on one of the components in each friction pair 2, and does not need to be provided on both friction surfaces of the same friction pair 2.

More preferably, since the eccentric wheel 5 and the wedge block 6 are in motion while the seat recliner adjusts the angle, at least one oil collecting element 1 may be mounted on each of the inner and outer end faces of the eccentric wheel 5 and the wedge block 6. Then, the eccentric wheel 5 and the wedge block 6 may drive the oil collecting elements 1 to rotate as they rotates, and then act on the outer surface of the shaft shoulder 31 and the inner wall of the central hole 41 via the oil collecting members 1 so as to re-collect the lubricating oil circumferentially distributed on the shaft shoulder 31 and the inner wall of the central hole 41.

Considering that the components for forming the friction pairs 2 with each of the eccentric wheel 5 and the wedge block 6 are the outer surface of the shaft shoulder 31 and the inner wall of the central hole 41, the oil collecting element 1 may be provided on solely the eccentric wheel 5 or solely the wedge block 6 so that the lubricating oil is re-collected onto the outer surface of the shaft shoulder 31 or onto the inner wall of the central hole 41, that is, there is no need for providing the oil collecting element 1 on both the eccentric wheel 5 and the wedge block 6, thereby reducing the cost and simplifying the disassembly.

Figure 8:
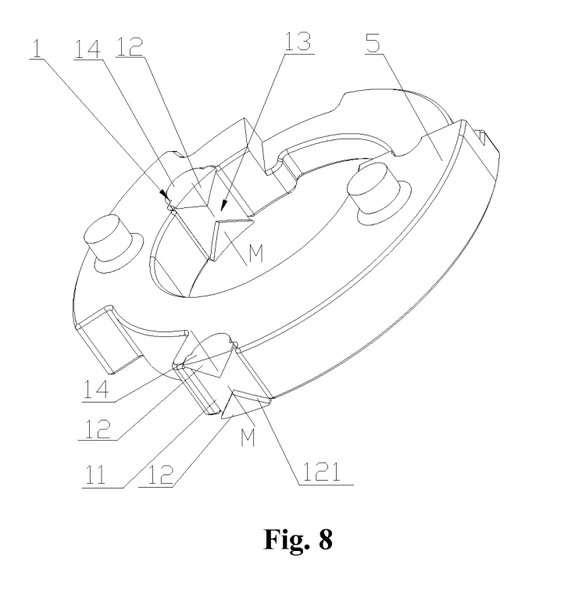
FIG. 8 is a perspective structural view of an oil collecting element according to the present application which is in an embodiment arranged on an eccentric wheel.
Figure 9A:
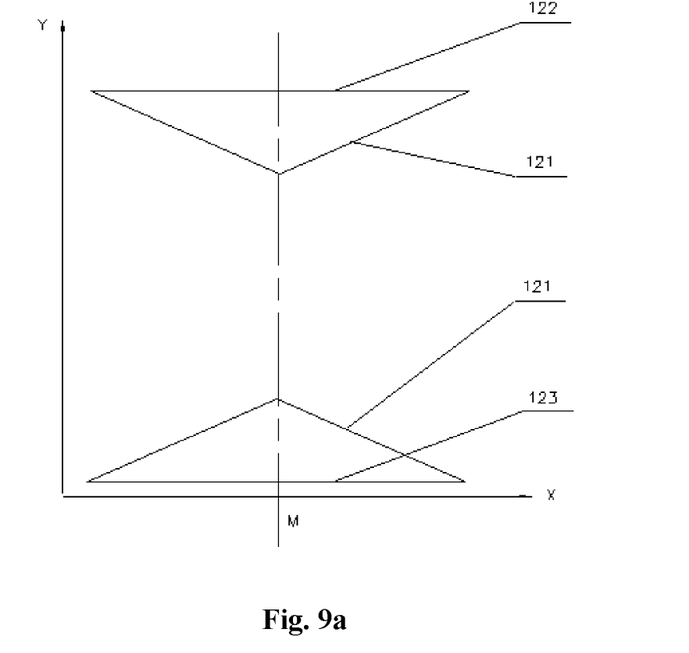
FIG. 9 is a cross sectional schematic view of a boss in the oil collecting element as shown in FIG. 8.
Figure 9B:
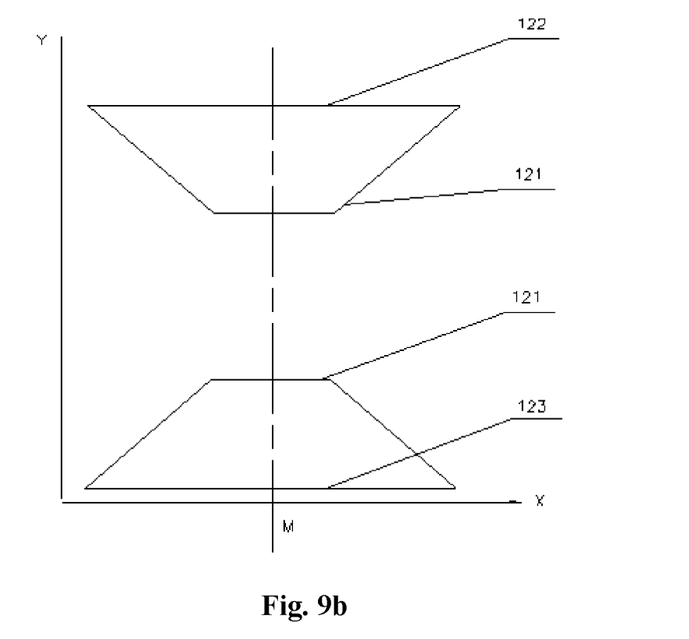
Figure 9C:
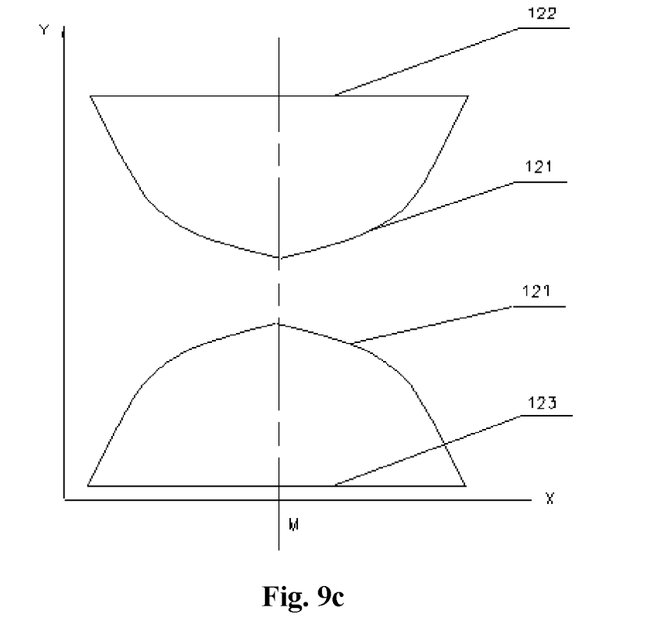
Figure 10:
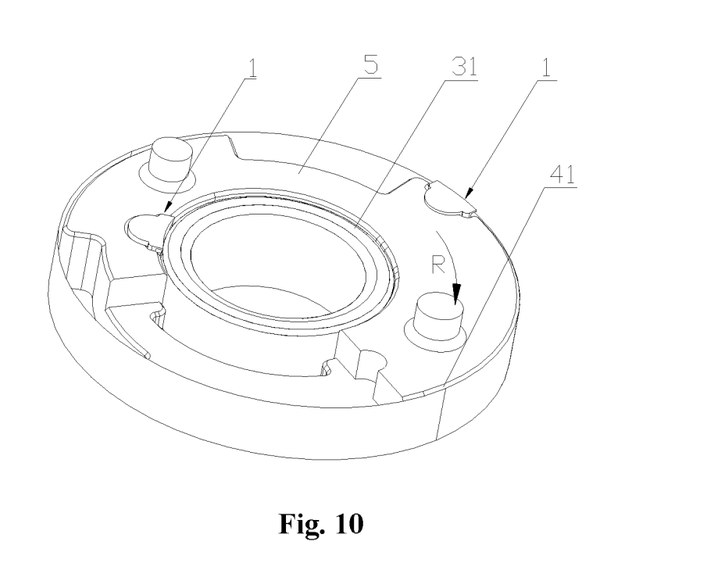
FIG. 10 is a schematic structural view of the eccentric wheel as shown in FIG. 8 mounted between an inner toothed plate and an outer toothed plate.
Figure 11:
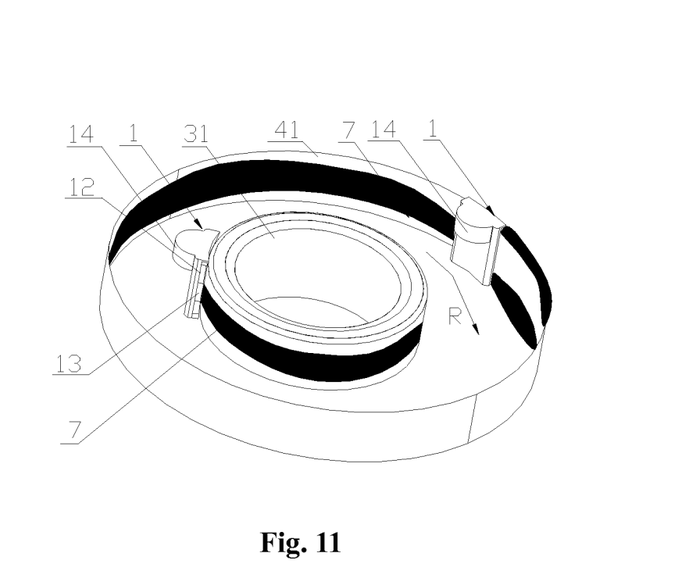
FIG. 11 is a schematic view of the working process of the oil collecting element according to the present application.

Referring to FIGS. 8 to 11, FIG. 8 is a perspective structural view of an arrangement of an eccentric wheel according to the present application; FIG. 9 is a cross sectional schematic view of a boss in the oil collecting element as shown in FIG. 8; FIG. 10 is a schematic structural view of the eccentric wheel as shown in FIG. 8 mounted between an inner toothed plate and an outer toothed plate; and FIG. 11 is a schematic view of the working process of the oil collecting element according to the present application.

For easy to be assembled or disassembled, a connecting boss 14 may be provided on the oil collecting element 1, and a groove engaged with the connecting boss 14 may be provided on each of the eccentric wheel 5 and the wedge block 6, so that the oil collecting element 1 is fixedly engaged via the connecting boss 14. When the oil collecting element 1 is not in need or is to be replaced, the connecting boss 14 may be directly detached from the groove. It is to be appreciated by the person skilled in the art that, it is not limited to the connecting boss 14 and the groove, and any other detachable connecting means may also be adopted.

Furthermore, the four friction pairs 2 described above are often found in a seat recliner. If there is another friction pair 2 in the seat recliner, the oil collecting element 1 may also be provided on this another friction pair 2, and may be configured similar to the above structure, so as to achieve the oil collecting effect and reduce the wear of the parts.

Hereinafter, description will be made in an example in which the oil collecting element 1 is arranged on the eccentric wheel 5. However, this cannot be considered that the oil collecting element 1 according to the present application may be arranged only on the eccentric wheel 5. The oil collecting element 1 may be provided on other friction components and may be configured with reference to the structure on the eccentric wheel 5.

In an embodiment, the oil collecting element 1 according to the present application is fixedly connected with one component in a friction pair 2 of the seat recliner, and has an end face 11 facing towards the other component in the friction pair 2. Each of two ends of the end face 11 is provided with a boss 12, such as to form an oil collecting gap 13 at the middle of the end face 11. The side face of the boss 12 is an oil guiding face 121 configured to be gradually closer to the center of the oil collecting gap 13 in a direction from outside to inside.

Since the surfaces of the bosses 12 protruding out of the end face 11 are provided at two ends thereof, the faces of the two bosses 12 opposite to each other are respective side faces of the bosses, i.e., the oil guiding faces 121, as shown in FIG. 8.

When the oil collecting element 1 is mounted on the seat recliner, the direction of the oil collecting element 1 parallel to the central axis of the seat recliner is a longitudinal direction of the oil collecting element 1. The side of the oil collecting element 1 adjacent to the longitudinal centerline M of the oil collecting element 1 is an inner side of the oil collecting element 1, and the direction from outside to inside means the direction orienting from the side away from the longitudinal centerline M of the oil collecting element 1 to the longitudinal centerline M of the oil collecting element 1.

For the convenience of expression, the end face of the boss 12 located above the longitudinal centerline M is defined as a top face, and the end face located below the longitudinal centerline M is defined as a bottom face. In the case of the top face and the bottom face of the boss 12 being flat faces, the line connecting the end points at the two sides of the oil guiding face 121 is taken as an X-axis, the orientation of the rotation direction R being taken as a positive direction of the X-axis, and the line parallel to the longitudinal centerline M is taken as a Y-axis, the direction from the down to up being taken as a positive direction of the Y-axis, as shown in FIG. 9.

In FIG. 9, the boss 12 located at an upper position along the Y-axis is defined as a first boss 122, and the boss 12 located at a lower position along the Y-axis is defined as a second boss 123. The first boss 122 is arranged upside-down. The vertical coordinates of points on the oil guiding face 121 of the first boss 122 are reduced first and then increased in the positive direction of the X-axis, and are symmetrically arranged with respect to the vertical line of the longitudinal centerline M. Since the first boss 122 is of an upside-down structure, the distances from the points on its oil guiding face 121 to the top face gradually increase. The vertical coordinates of points on the oil guiding face 121 of the second boss 123 are increased first and then reduced in the positive direction of the X-axis, and are symmetrically arranged with respect to the vertical line of the longitudinal centerline M. With the above structure, the oil collecting gap 13 between the first boss 122 and the second boss 123 is small at the middle portion and is large at the two ends, and thus the oil guiding faces 121 of the first boss 122 and the second boss 123 function as oil guiding faces capable of guiding the lubricating oil smoothly into the oil collecting gap 13 and enabling the lubricating oil to flow onto the friction surfaces through the oil collecting gap 13.

It may be seen that, the oil guiding face 121 according to the present application is not limited to be configured in a half circular shape, a trapezoidal shape, or a triangular shape, so long as the oil guiding face 121 has a certain inclination facilitating the lubricating oil to be guided into the middle of the oil collecting gap 13 gradually.

Furthermore, the first boss 122 and the second boss 123 may also be of different structures. For example, the cross section of the first boss 122 may be configured in a trapezoidal shape, and the cross section of the second boss 123 may be configured in a triangular shape or any other shape.

As shown in FIGS. 10 and 11, the black portion represents lubricating oil 7, and the direction indicated by the arrow R is a rotation direction of the eccentric wheel 5 and the oil collecting element 1.

When the eccentric wheel 5 rotates, the oil collecting element 1 arranged thereon rotates along with the eccentric wheel 5. During rotation, the forward side along the rotation direction R of the oil guiding face 121 may firstly contact with the inner wall of the central hole 41 of the outer toothed plate 4, so as to scrape the lubricating oil 7 rolled to the two ends of the other component onto the oil guiding face 121. Since the oil collecting element 1 keeps rotating along the rotation direction R, though the lubricating oil 7 may keep rotating along with the oil guiding face 121 under the inertial force at a rotation speed smaller than the movement speed of the oil guiding face 121, the lubricating oil 7 gradually flows towards the oil collecting gap 13 at the middle of the end face 11 along the oil guiding face 121, thereby re-collecting the lubricating oil 7. Since the end face 11 is arranged towards the inner wall of the central hole 41, the lubricating oil 7 flowing into the oil collecting gap 13 is limited between the inner wall of the central hole 41 and the end face 11, so that the lubricating oil 7 re-adheres to the inner wall of the central hole 41. After the boss 12 rotates away from the last oil collecting position (that is the position at which the boss 12 abuts against the inner wall of the central hole 41), the outer end face of the eccentric wheel 5 re-contact with the inner wall of the central hole 41, and performs the relative movement with lubricating oil therebetween. As shown in FIG. 10, at the forward side along the rotating direction R, the lubricating oil is rolled to the two ends, and after the oil collecting element 1 passes by, the lubricating oil is re-collected in the middle, so as to lubricate the friction surfaces.

Further improvements may be made to the above oil collecting element 1.

Figure 12:
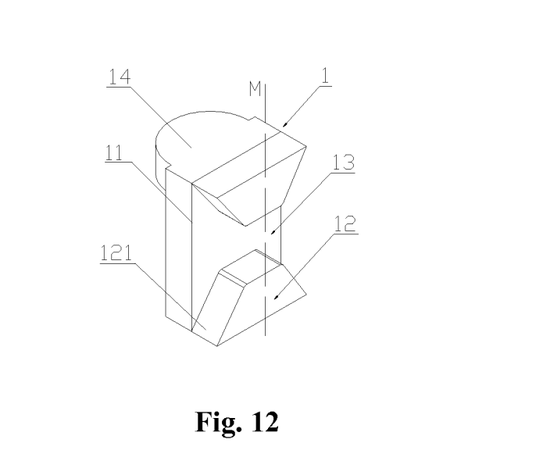
FIG. 12 is a perspective structural view of the oil collecting element in a first embodiment according to the present application.
Figure 13:
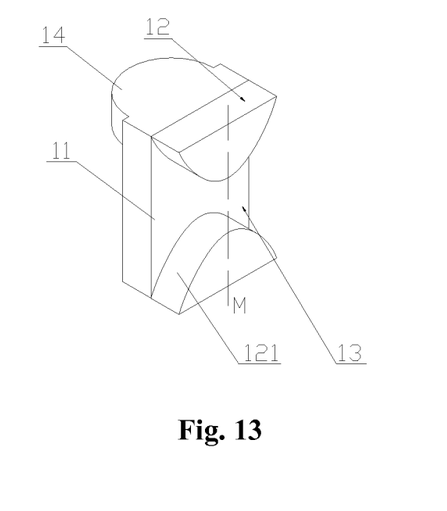
FIG. 13 is a perspective structural view of the oil collecting element in a second embodiment according to the present application.

Referring to FIGS. 12 to 13, FIG. 12 is a perspective structural view of the oil collecting element in a first embodiment according to the present application; and FIG. 13 is a perspective structural view of the oil collecting element in a second embodiment according to the present application.

The bosses 12 located at the two ends may be configured as a symmetrical structure, and each of the bosses 12 is configured to be a symmetrical structure with respect to the longitudinal centerline M of the oil collecting element 1.

It is to be noted that, when the oil collecting element 1 is mounted on one component in a friction pair 2, the parts adjacent to the two opposite end faces of the component constitute two ends of the oil collecting element 1 being also the two ends of the oil collecting element 1 opposite to each other in the longitudinal direction. Taking the oil collecting element 1 mounted on the eccentric wheel 5 as an example, the longitudinal direction of the oil collecting element 1 is the direction parallel to the axis of the eccentric wheel 5. As shown in FIGS. 8, 12 and 13, the longitudinal direction of the oil collecting element 1 includes the direction of its longitudinal centerline M and the direction parallel to the longitudinal centerline M. Correspondingly, the direction perpendicular to the longitudinal centerline M in a horizontal plane is a transverse direction of the oil collecting element 1.

When the bosses 12 is arranged symmetrically about the longitudinal centerline M, the two sides of the oil guiding face 121 of the boss 12 have the same structure, and no matter whether the rotation direction R of the boss 12 is a clockwise or anti clockwise direction, the forward side of the oil guiding face 121 along the rotation direction R may scrape the lubricating oil 7, and then may collect the lubricating oil into the oil collecting gap 13 smoothly, which has a more broad application scope, and a more flexible and convenient operation.

In another aspect, when the oil guiding face 121 is of a symmetrical structure, the lubricating oil flows into the oil collecting gap 13 from outside to inside along the oil guiding face 121 at substantially the same rate, so as to improve the evenness of the lubrication to the friction surfaces.

In the case of the boss 12 arranged symmetrically, the cross section of the boss 12 may be configured to be in a half circular shape, an isosceles trapezoidal shape or an isosceles triangular shape, as shown in FIG. 13. Apparently, when the boss 12 is of an asymmetrical structure, the cross section of the boss 12 may be also arranged to be in a trapezoidal shape, a triangular shape and so on.

The seat recliner and the oil collecting element thereof according to the present application have been described above in detail. Specific examples are used herein to describe the principle and implementation of the present application. The description of the examples and the embodiments are only for the purpose of better understanding the spirit of the seat recliner and the oil collecting element of the present application. It should be noted that, various improvements and modifications can be made by those skilled in the art without departing from the principle of the present application, and these improvements and modifications also fall within the scope of protection defined by the claims.

What is claimed is:

1. An oil collecting element of a seat recliner, wherein the oil collecting element is fixedly connected with one of two components forming a friction pair in the seat recliner, and has an end face facing towards the other component in the friction pair, each of an upper end and a lower end of the end face is provided with a boss, such as to form an oil collecting gap between the upper end and the lower end of the end face; a side face of each boss serves as an oil guiding face, and is configured to guide oil from the upper and lower ends towards a longitudinal centerline of the oil collecting gap.

2. The oil collecting element according to claim 1, wherein each boss is symmetrically configured with respect to a longitudinal centerline of the oil collecting element.

3. The oil collecting element according to claim 2, wherein a cross section of each boss is configured to be in a half circular shape.

4. The oil collecting element according to claim 3, wherein the oil collecting element is an elastic member.

5. The oil collecting element according to claim 2, wherein a cross section of each boss is configured to be in an isosceles trapezoidal shape.

6. The oil collecting element according to claim 5, wherein the oil collecting element is an elastic member.

7. The oil collecting element according to claim 2, wherein a cross section of each boss is configured to be in an isosceles triangular shape.

8. The oil collecting element according to claim 7, wherein the oil collecting element is an elastic member.

9. The oil collecting element according to claim 2, wherein the oil collecting element is an elastic member.

10. The oil collecting element according to claim 1, wherein the oil collecting element is an elastic member.

11. A seat recliner, comprising a friction pair formed between two components; and the oil collecting element according to claim 1, wherein one component in the friction pair is fixedly connected with the oil collecting element.

12. The seat recliner according to claim 11, comprising an inner toothed plate with a shaft shoulder, an outer toothed plate with a central hole, an eccentric wheel and a wedge block, wherein friction pairs are formed between the eccentric wheel and an outer surface of the shaft shoulder, between the eccentric wheel and an inner wall of the central hole, between the wedge block and an outer surface of the shaft shoulder, and between the wedge block and an inner wall of the central hole.

13. The seat recliner according to claim 12, wherein the oil collecting element is provided with a connecting boss, and wherein the eccentric wheel and the wedge block each are provided with a groove fixedly engaged with the connecting boss.

14. The seat recliner according to claim 11, wherein the boss is symmetrically configured with respect to a longitudinal centerline of the oil collecting element.

15. The seat recliner according to claim 14, wherein a cross section of each boss is configured to be in a half circular shape.

16. The seat recliner according to claim 15, wherein the oil collecting element is an elastic member.

17. The seat recliner according to claim 14, wherein a cross section of each boss is configured to be in an isosceles trapezoidal shape.

18. The seat recliner according to claim 14, wherein a cross section of each boss is configured to be in an isosceles triangular shape.

19. The seat recliner according to claim 14, wherein the oil collecting element is an elastic member.

20. The seat recliner according to claim 11, wherein the oil collecting element is an elastic member.

* * * * *